(12) United States Patent
Yamada et al.

(10) Patent No.: US 7,503,614 B2
(45) Date of Patent: Mar. 17, 2009

(54) SEAT SLIDING APPARATUS FOR VEHICLE AND METHOD OF ASSEMBLING THE SAME

(75) Inventors: Yukifumi Yamada, Toyota (JP); Yasuhiro Kojima, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 123 days.

(21) Appl. No.: 11/585,239

(22) Filed: Oct. 24, 2006

(65) Prior Publication Data

US 2007/0090230 A1  Apr. 26, 2007

(30) Foreign Application Priority Data

Oct. 25, 2005 (JP) .............................. 2005-310127

(51) Int. Cl.
*B60N 2/07* (2006.01)
(52) U.S. Cl. ................. 296/65.13; 296/65.14; 248/429; 248/430
(58) Field of Classification Search ............. 296/65.13, 296/65.14; 248/429, 430, 424
See application file for complete search history.

(56) References Cited

U.S. PATENT DOCUMENTS

| 4,726,617 | A | * | 2/1988 | Nishimura | 296/65.13 |
|---|---|---|---|---|---|
| 4,787,667 | A | * | 11/1988 | Nishino | 296/65.13 |
| 4,804,229 | A | * | 2/1989 | Nishino | 297/471 |
| 5,048,787 | A | * | 9/1991 | Saitoh | 248/430 |
| 5,222,814 | A | * | 6/1993 | Boelryk | 384/47 |
| 5,676,341 | A | * | 10/1997 | Tarusawa et al. | 248/430 |
| 6,089,521 | A | * | 7/2000 | Tarusawa et al. | 248/430 |
| 6,460,929 | B2 | * | 10/2002 | Kamida | 297/344.1 |
| 6,688,574 | B2 | * | 2/2004 | Okazaki et al. | 248/424 |
| 6,772,985 | B2 | * | 8/2004 | Lee | 248/424 |
| 6,773,068 | B2 | * | 8/2004 | Shinozaki | 297/344.1 |
| 6,874,747 | B2 | * | 4/2005 | Oh | 248/430 |
| 6,981,681 | B2 | * | 1/2006 | Matsumoto | 248/424 |
| 7,066,521 | B2 | * | 6/2006 | Jung et al. | 296/65.13 |
| 7,147,195 | B2 | * | 12/2006 | Danjo et al. | 248/430 |
| 7,314,204 | B2 | * | 1/2008 | Kohmura | 248/430 |
| 7,328,877 | B2 | * | 2/2008 | Yamada et al. | 248/430 |
| 2007/0069098 | A1 | * | 3/2007 | Kojima | 248/429 |
| 2007/0090263 | A1 | * | 4/2007 | Yamada et al. | 248/429 |

FOREIGN PATENT DOCUMENTS

JP          58-19836          10/1983

* cited by examiner

*Primary Examiner*—Jason S Morrow
(74) *Attorney, Agent, or Firm*—Finnegan, Henderson, Farabow, Garrett & Dunner, LLP

(57) ABSTRACT

A seat sliding apparatus for a vehicle, includes: restraining means for restraining a sliding movement of an upper rail in a front-rear direction of a seat and having a first projection preformed at the upper rail and second projections preformed at a lower rail before assembling the upper and lower rails; and a slide supporting member disposed between the upper rail and lower rails, supporting the upper rail to be slidable in the front-rear direction relative to the lower rail and positioning the upper rail to the finally assembled position in the vertical direction. The lower rail and the upper rail are structured in a way that an interval between the first projection and each second projection along the vertical direction in which the upper rail moves between the insertion position and the finally assembled position is greater than zero.

6 Claims, 9 Drawing Sheets

SEAT SLIDING APPARATUS FOR VEHICLE AND METHOD OF ASSEMBLING THE SAME

CROSS REFERENCE TO RELATED APPLICATIONS

This application is based on and claims priority under 35 U.S.C. §119 to Japanese Patent Application 2005-308089, filed on Oct. 24, 2005, the entire content of which is incorporated herein by reference.

FIELD OF THE INVENTION

This invention generally relates to a seat sliding apparatus for a vehicle and a method of assembling the seat sliding apparatus.

BACKGROUND

As one of known seat sliding apparatus for vehicles, Japanese Patent Utility Model 58(1983)-19836 discloses therein a seat sliding apparatus which includes: a lower rail fixedly mounted on an upper surface of a floor of a vehicle; an upper rail secured to a lower surface of a seat of the vehicle and mounted to be movable in a longitudinal direction of the lower rail; and restricting means for restricting a slidable movement of the upper rail over a predetermined moving amount in the longitudinal direction in a state where the upper rail has already been mounted onto the lower rail. This restricting means is configured with cut and bent portions formed at an upper wall near both ends of the upper rail and stepped portions formed at a flange inside of the lower rail. The lanced portions of the upper rail each come in contact with the stepped portions of the lower rail. Each cut and bent portion is formed by cutting and bending a portion of the upper wall of the upper rail after mounting the upper rail to the lower rail.

In the seat sliding apparatus for the vehicle described above, a process is required after putting the upper rail and the lower rail together, which process is for example a press working for forming the lanced portions, which serve as restricting means. That is, an additional process is required, which may result in an increase in a manufacturing time. Further, when large force is applied to an assembly of the upper rail and the lower rail, each component may undesirably deform, which may deteriorate a sliding performance of the upper rail relative to the lower rail.

The present invention has been made in view of the above circumstances, and provides a seat sliding apparatus for a vehicle and a method of mounting an upper rail onto a lower rail of the seat sliding apparatus. According to the seat sliding apparatus and the method, sliding performance of the upper rail relative to the lower rail is not deteriorated, and the seat sliding apparatus is manufactured with a simple process.

SUMMARY OF THE INVENTION

According to an aspect of the present invention, a seat sliding apparatus for a vehicle includes: a lower rail secured to a stationary portion of the vehicle; an upper rail fixedly attached to a seat of the vehicle and assembled to the lower rail to be movable in a front-rear direction of the seat, the upper rail being movable between an insertion position and a finally assembled position in a vertical direction within a space defined between the upper rail and the lower rail; restraining means for restraining a sliding movement of the upper rail over a predetermined moving amount in the front-rear direction of the seat, the restraining means including a first projection preformed at the upper rail and second projections preformed at the second rail before assembling the second rail and the first rail, the lower rail and the upper rail being structured in a way that an interval between the first projection and each second projection along the vertical direction in which the upper rail moves between the insertion position and the finally assembled position is greater than zero, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction.

According to another aspect of the present invention, a seat sliding apparatus for a vehicle includes: a lower rail secured to a stationary portion of the vehicle; an upper rail fixedly attached to a seat of the vehicle and assembled to the lower rail to be movable in a front-rear direction of the seat, the upper rail being structured without a contact with a portion of the lower rail when inserting one of the lower and upper rails to the other one thereof, and the lower rail being structured without a contact with a portion of the upper rail when inserting one of the lower and upper rails to the other one thereof; restraining means for restraining a sliding movement of the upper rail over a predetermined moving amount in the front-rear direction of the seat, the restraining means including a first projection preformed at the upper rail and second projections preformed at the second rail before assembling the second rail and the first rail, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction.

According to still another aspect of the present invention, a method of assembling a seat sliding apparatus for a vehicle, the seat sliding apparatus including: a lower rail secured to a stationary portion of the vehicle; an upper rail fixedly attached to a seat of the vehicle and assembled to the lower rail to be movable in a front-rear direction of the seat, the upper rail being movable between an insertion position and a finally assembled position in a vertical direction within a space defined between the upper rail and the lower rail; restraining means for restraining a sliding movement of the upper rail over a predetermined moving amount in the front-rear direction of the seat, the restraining means including a first projection preformed at the upper rail and second projections preformed at the second rail before assembling the second rail and the first rail, the lower rail and the upper rail being structured in a way that an interval between the first projection and each second projection along the vertical direction in which the upper rail moves between the insertion position and the finally assembled position is greater than zero, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction, includes the steps of: inserting the upper rail into the lower rail and positioning the upper rail to the insertion position; moving the upper rail from the insertion position to the finally assembled position; and inserting the slide supporting member between the upper rail and the lower rail so that the upper rail is positioned at the finally assembled position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
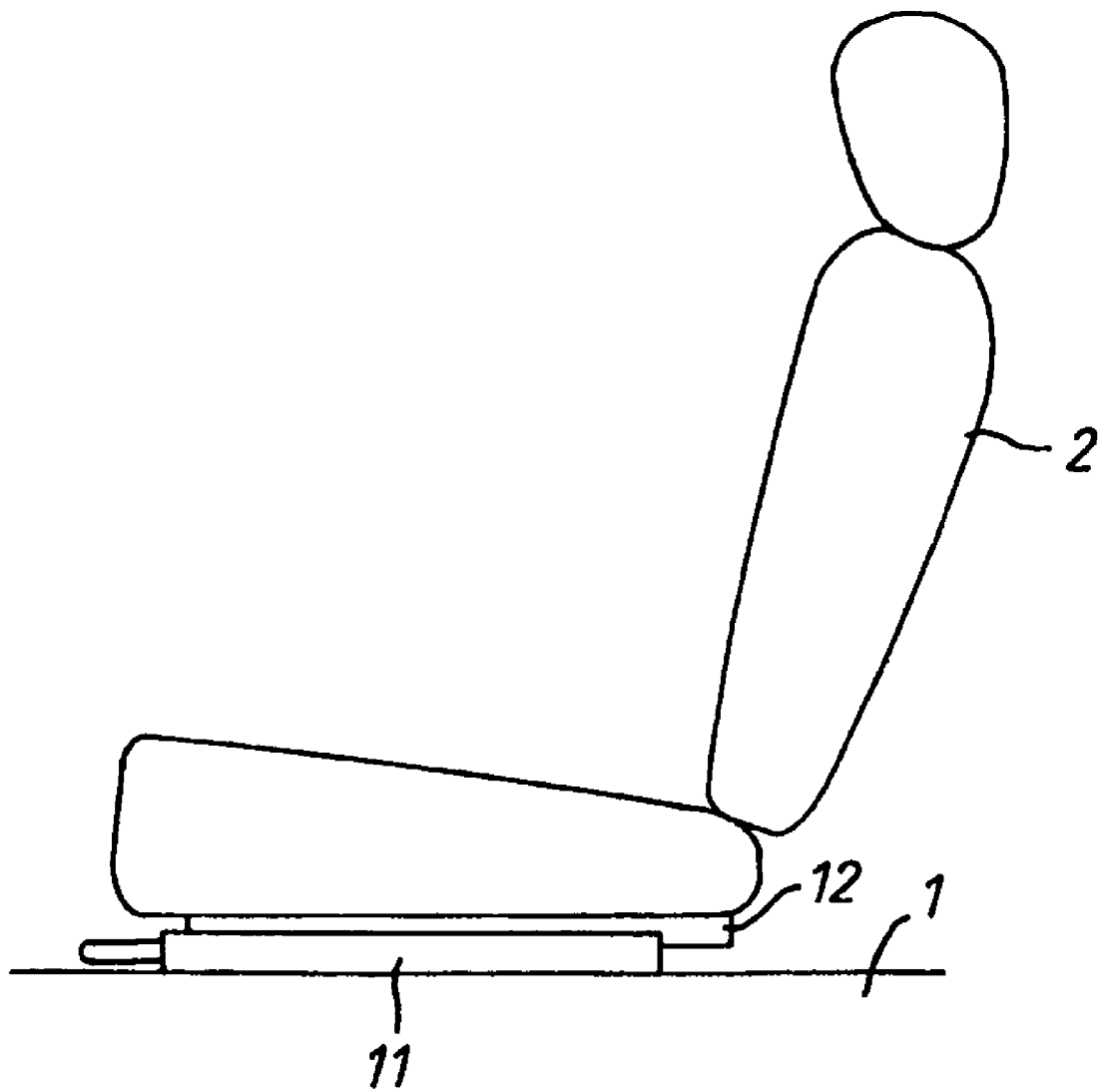
FIG. 1 is a side view illustrating a seat sliding apparatus for a vehicle according to an embodiment of the present invention.
Figure 2:
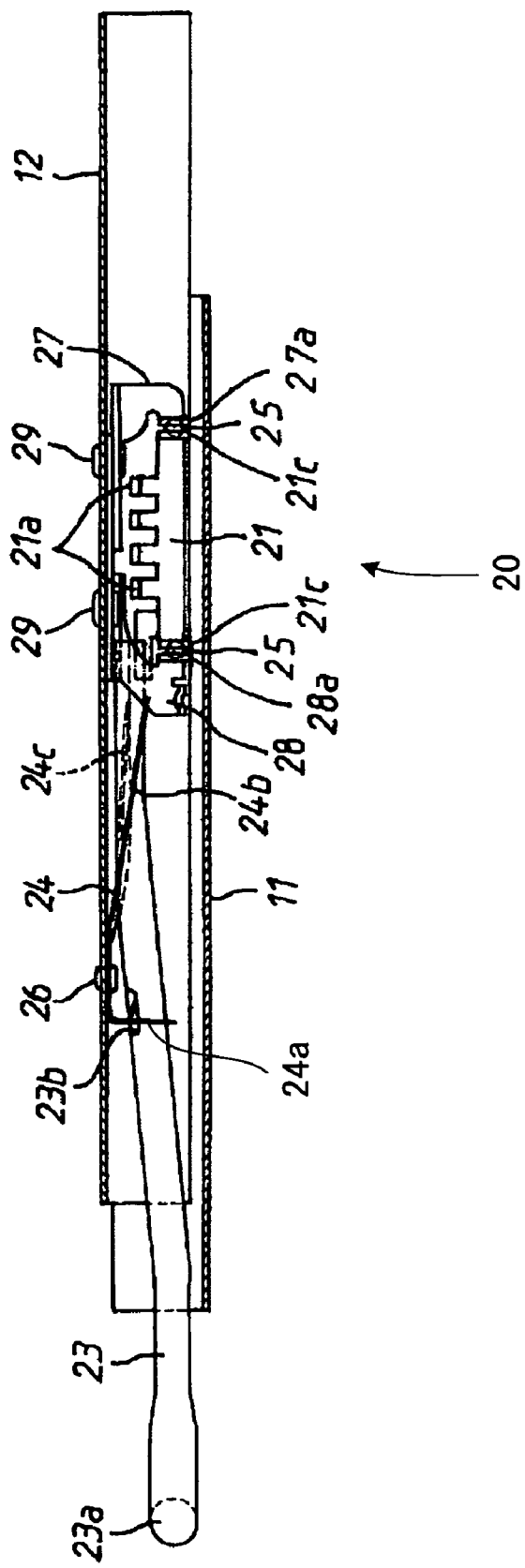
FIG. 2 is a side view illustrating an internal structure of the seat sliding apparatus for the vehicle illustrated in FIG. 1.
Figure 3:
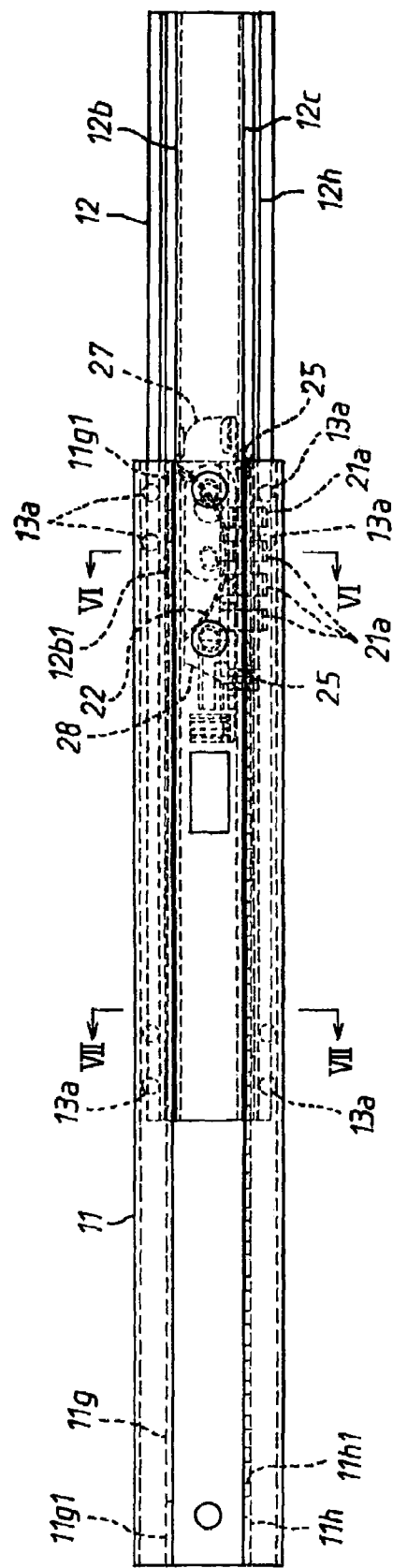
FIG. 3 is a plan view illustrating the seat sliding apparatus for a vehicle illustrated in FIG. 1.
Figure 4:
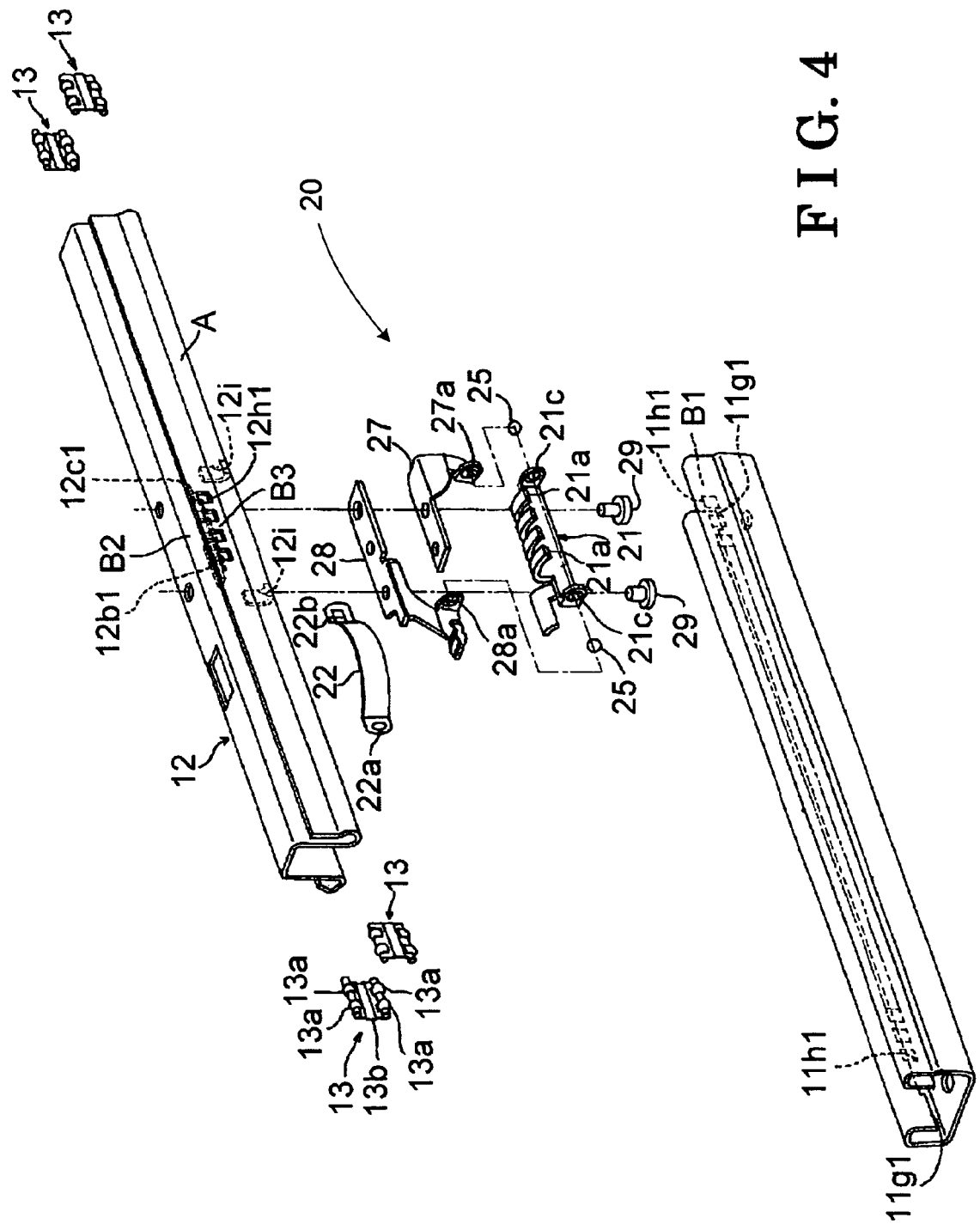
FIG. 4 is an exploded perspective view illustrating the seat sliding apparatus for the vehicle illustrated in FIGS. 1, 2 and 3.
Figure 5:
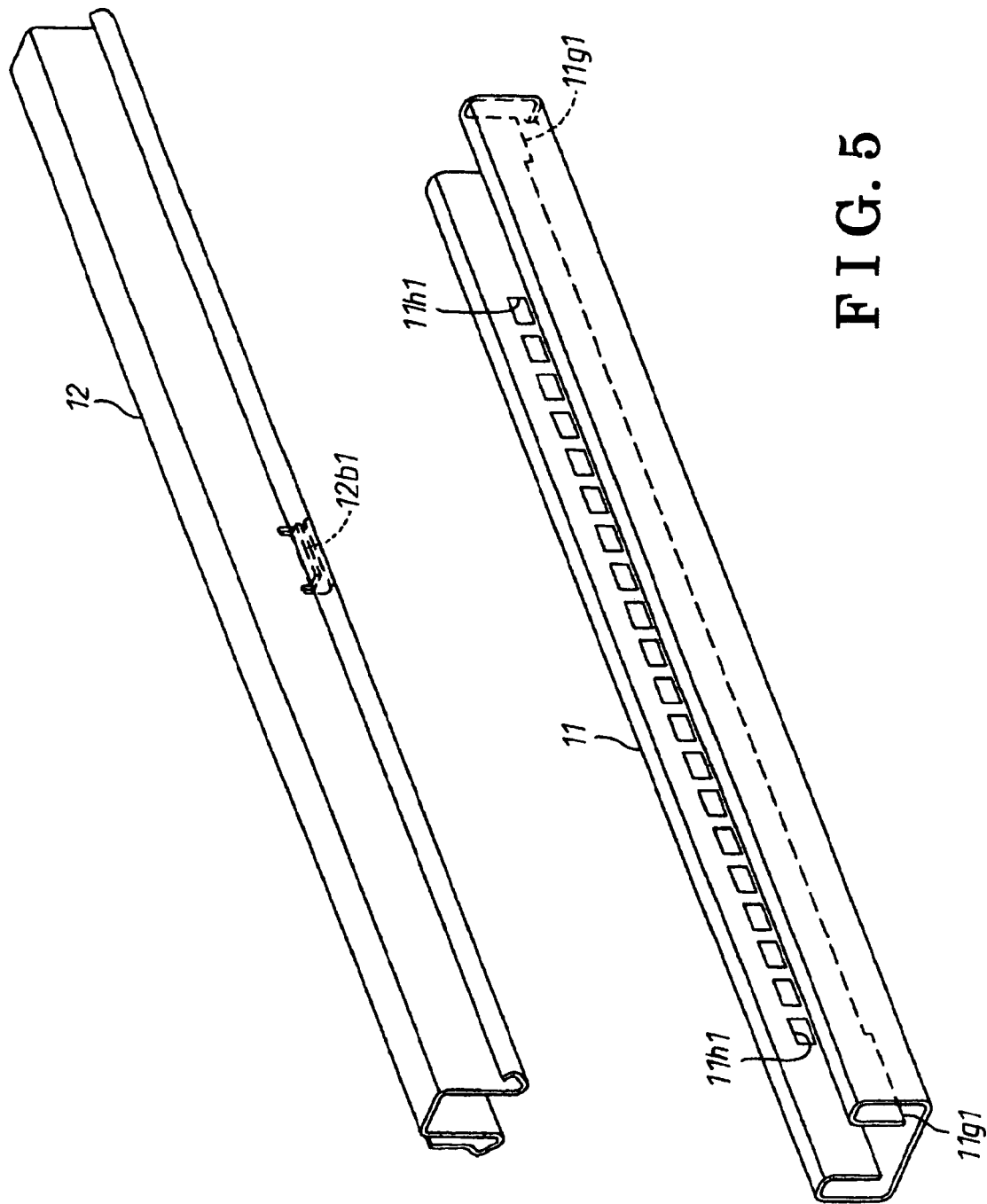
FIG. 5 is an exploded perspective view illustrating an upper rail and a lower rail from an opposite side relative to FIG. 4.
Figure 6:
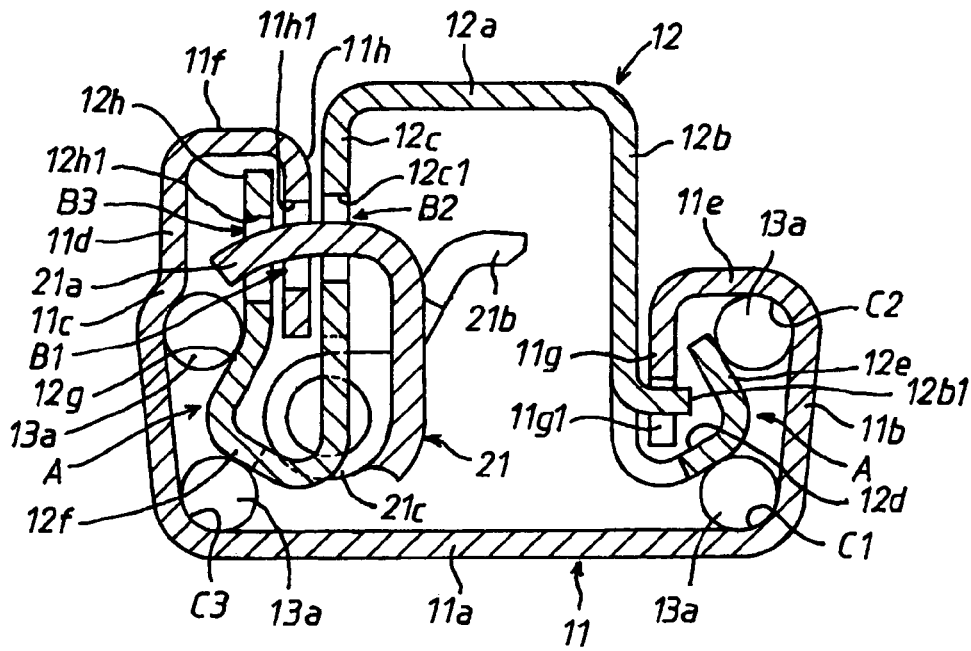
FIG. 6 is an enlarged cross sectional view of the seat sliding apparatus taken along line VI-VI in FIG. 3 and illustrating a detailed structure of a portion in which a sliding portion and a lock portion of the upper rail lie over.
Figure 7:
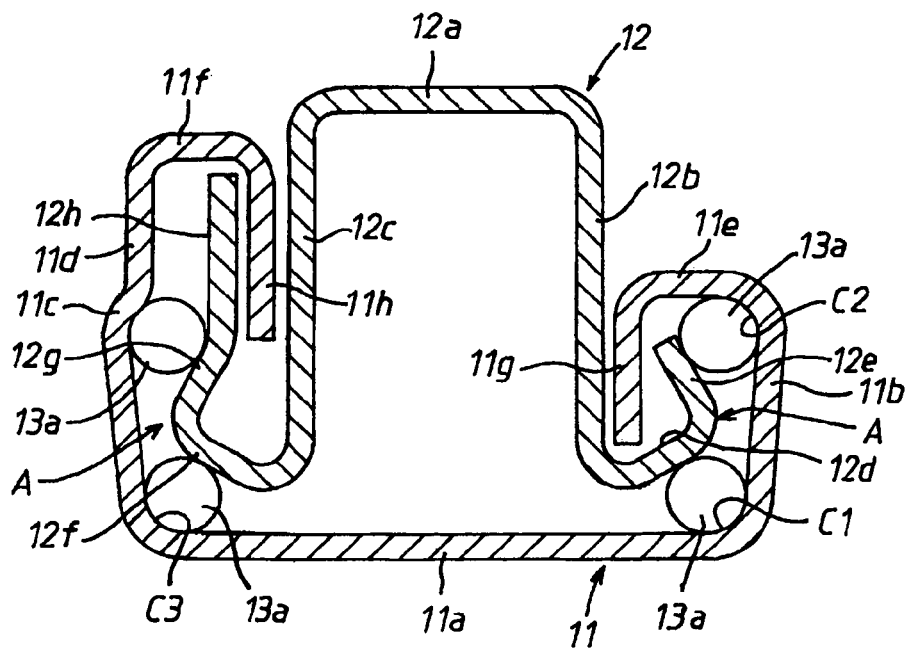
FIG. 7 is an enlarged cross sectional view of the seat sliding apparatus taken along line VII-VII in FIG. 3 and illustrating a detailed structure of only the sliding portion of the upper rail.
Figure 8:
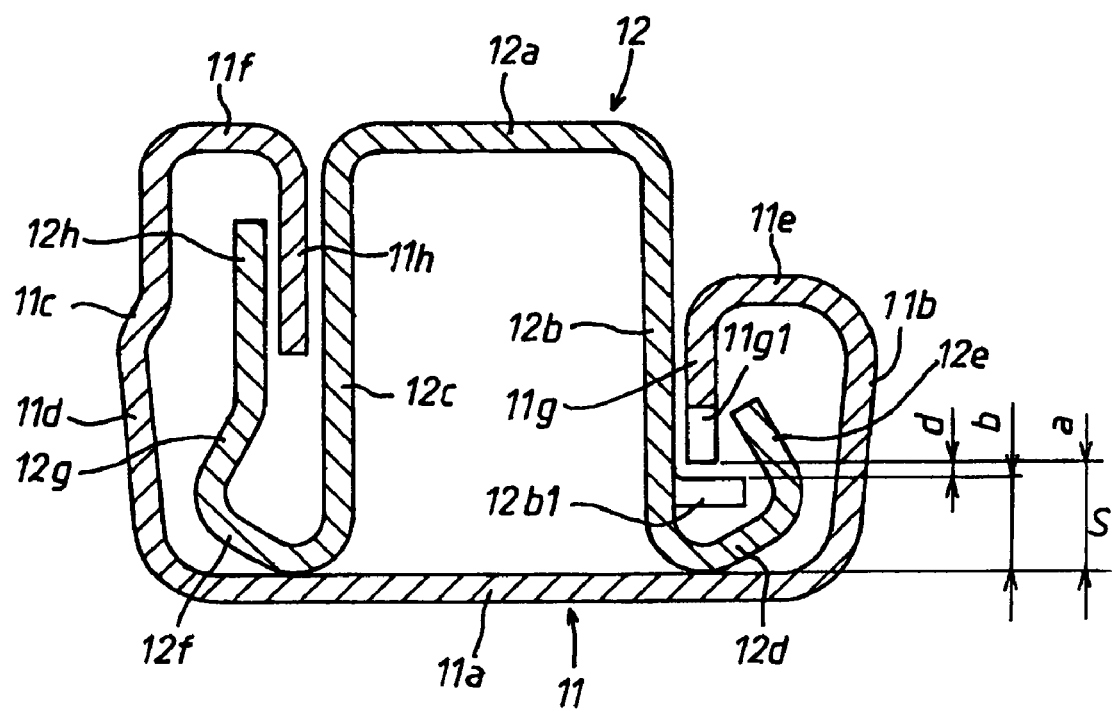
FIG. 8 is a cross sectional view illustrating the upper rail at an insertion position and a positional relation of the upper rail at the insertion position relative to the lower rail.

An embodiment of the present invention will be described hereinbelow with reference to the attached drawings. FIGS. 1 and 3 are respectively a side view, and a plan view illustrating a seat sliding apparatus for a vehicle. FIG. 2 is a side view illustrating an internal structure of the seat sliding apparatus for the vehicle. FIG. 4 is a perspective view illustrating the seat sliding apparatus. FIG. 5 is an exploded perspective view illustrating only upper and lower rails as viewed from an opposite side to FIG. 4. FIG. 6 is a cross sectional view illustrating a portion of the seat sliding apparatus, at which a sliding portion and a lock portion of the upper rail lie over. FIG. 7 is a cross sectional view illustrating only the sliding portion of the upper rail. FIG. 8 is a cross sectional view illustrating an insertion position of the upper rail.

A seat sliding apparatus for a vehicle according to the embodiment of the present invention includes: a pair of lower rails 11, which is fixedly mounted on an upper surface of a floor 1 of the vehicle and are arranged at the left and right portions of a seat 2; a pair of upper rails 12, which is secured to a lower surface of the seat 2 and are mounted to the lower rails 11, and a lock mechanism 20 arranged between each lower rail 11 and the corresponding upper rail 12. Each upper rail 12 is mounted onto the lower rail 11 via four ball units 13, each of which serves as a slide supporting member in a manner that each upper rail 12 is slidably movable at a predetermined moving amount in a front-rear direction of the lower rail 11 or in a traveling direction of the vehicle.

As is illustrated in FIGS. 5, 6 and 7, each lower rail 11 includes: a bottom portion 11a; a first sidewall 11b; a bent portion 11c; a second sidewall 11d; a first upper wall 11e; a second upper wall 11f; a first vertical portion 11g; and a second vertical portion 11h, and they are integrally formed to establish the lower rail 11. The lower rail 11 exhibits an approximately identical cross section over an entire length along the front-rear or longitudinal direction thereof. FIGS. 6 and 7 illustrate therein only the lower rail 11, the upper rail 12, a lock lever 21, and balls 13a.

The bottom portion 11a exhibits an approximately rectangular shape and is arranged in parallel with the floor 1. The bottom portion 11a is fixedly mounted on the floor 1 (stationary portion). The first sidewall 11b is integrally formed at a side edge of the bottom portion 11a and stands upright vertically in an upper direction in FIG. 6. The second sidewall 11d is integrally formed at the other side edge of the bottom portion 11a and stands upright in the upper direction. The second sidewall 11d is higher than the first sidewall 11b, in FIG. 6. The bent portion 11c is formed partway or halfway on the second sidewall 11d. The first upper wall 11e is connected, at its edge, to an upper edge of the first sidewall 11b and extends towards the second sidewall 11d in parallel with the bottom portion 11a. The second upper wall 11f is connected, at its edge, to an upper edge of the second sidewall 11d and extends towards the first sidewall 11b in parallel with the bottom portion 11a. The first vertical portion 11g extends downwardly towards the bottom portion 11a from the other edge of the first upper wall 11e. Second projections 11g1 and 11g1 are formed at both longitudinal ends of the first vertical portion 11g of the lower rail 11. The second projections 11g1 and 11g1 are arranged so as to impact with a first projection 12b1 formed at the upper rail 12 such that a longitudinal movement of the upper rail 12 to the lower rail 11 is restrained by the impact or contact between each second projections 11g1 and the first projection 12b1. The second vertical portion 11h extends downwardly towards the bottom portion 11a from the other edge of the second upper wall 11f. A plurality of holes 11h1 are formed over an entire length of second vertical portion 11h and are arranged at a predetermined interval against each adjacent hole 11h1 among from the holes 11h1. The holes 11h1 are fitted or engaged with nails 21a (see FIG. 4) of the lock lever 21. An area or portion of the second vertical portion 11h, at which the holes 11h1 are provided, is referred to as a lock portion B1 (lock portion of the lower rail 11).

As is illustrated in FIGS. 5, 6 and 7, each upper rail 12 includes: an upper portion 12a; a third vertical portion 12b; a fourth vertical portion 12c; a first inclined portion 12d; a second inclined portion 12e; a third inclined portion 12f; a fourth inclined portion 12g; and an uprising portion 12h, and they are integrally formed to establish the upper rail 12. The upper rail 12 exhibits an approximately identical cross section over an entire length along the front-rear direction thereof.

The upper portion 12a is arranged in parallel with the bottom portion 11a of the lower rail 11 and is fixedly attached to the seat 2. The third vertical portion 12b extends downwardly from one edge of the upper portion 12a and is arranged between the first vertical portion 11g and the second vertical portion 11h. The third vertical portion 12b is mounted in the vicinity of the first vertical portion 11g and faces thereto in a parallel manner. The first projection 12b1 is provided at a longitudinally intermediate area of the third vertical portion 12b and projects towards the first vertical portion 11g. The first projection 12b1 makes a contact with each second projection 11g1 and restrains a forward/backward movement of the upper rail 12 relative to the lower rail 11. The fourth vertical portion 12c extends downward from the other edge of the upper portion 12a and is located between the first vertical portion 11g and the second vertical portion 11h. The fourth vertical portion 12c is designed to be approximately the same height as the third vertical portion 12b. The fourth vertical portion 12c is mounted in the vicinity of the second vertical portion 11h and faces thereto in a parallel manner. A plurality of holes 12c1 is formed at an approximately longitudinally intermediate area of the fourth vertical portion 12c. The holes 12c1 are provided at the same quantity as the nails 21a and are arranged at the predetermined interval against each adjacent hole 12c1 in a way that the holes 12ca are fitted or engaged with the nails 21a of the lock lever 21. An area or portion of the fourth vertical portion 12c, in which the holes 12c1 are provided, is referred to a lock portion B2 (lock portion of the upper rail 12).

The first inclined portion 12d is connected, at its one edge, to a lower edge of the third vertical portion 12b and extends in an angled upward direction towards the first sidewall 11b. More specifically, the first inclined portion 12d is arranged so as to face a corner C1, which is defined by the bottom portion 11a and the first sidewall 11b, with a space. The second inclined portion 12e is connected to the other edge of the first inclined portion 12d and extends in an angled upward direction towards the first vertical portion 11g. More specifically, the second inclined portion 12e is arranged so as to face a corner C2, which is defined by the first sidewall 11b and the first upper wall 11e, with a space. The third inclined portion 12f is connected, at its one edge, to the lower edge of the fourth vertical portion 12c and extends in an angled upward direction towards the second sidewall 11d. More specifically, the third inclined portion 12f e is arranged so as to face a corner C3, which is defined by the bottom portion 11a and the second sidewall 11d, with a space. The fourth inclined portion 12g is connected, at its one edge, to the other edge of the third inclined portion 12f and extends in an angled upward direction towards the second vertical portion 11h. More specifically, the fourth inclined portion 12g is arranged so as to face the bent portion 11c with a space. The uprising portion 12h is connected to the other edge of the fourth inclined portion 12g in a standing position and is arranged in the vicinity of the second vertical portion 11h in parallel thereto. A plurality of holes 12h1 is formed at an approximately longitudinally intermediate area of the uprising portion 12h. The holes 12h1 are fitted or engaged with the nails 21a of the lock lever 21 because the holes 12h1 are provided at the same quantity as the nails 21a and are arranged at the predetermined interval against each adjacent hole 12h1. An area or portion of the uprising portion 12h, in which the holes 12h1 are provided, is referred to a lock portion B3 (lock portion of the upper rail 12).

The aforementioned first projection 12b1 and the pair of second projections 11g1 and 11g1 are preformed at the upper rail 12 and the lower rail 11, respectively, before mounting the upper rail 12 to the lower rail 11. The lower rail 11 and the upper rail 12 are structured so as to define a space S i between the lower rail 11 and the upper rail 12, in a space S which the upper rail 12 is moved or shifted in a moving direction of the upper rail 12, i.e., in a vertical or up-and-down direction between an insertion position, which is illustrated in FIG. 8, and a finally assembled position. In the insertion position as illustrated in FIG. 8, the upper rail 12 is just inserted into the lower rail 11. In the finally assembled position, the upper rail 12 has been mounted on the lower rail 11 and the upper rail 12 and the first projection 12b1 is engageable with each second projection 11g1. As illustrated in FIG. 8, the lower rail 11 and the upper rail 12 are structured in a way that a distance "d" (=a-b) between the first projection 12b1 and each second projection 11g1 is greater than zero along the moving direction of the upper rail 12 between the insertion position and the finally assembled position. A symbol "a" denotes a minimal distance in the vertical direction between the lower edge of each second projection 11g1 and an upper surface of the bottom portion 11a. A symbol "b" denotes a minimal distance in the vertical direction between an upper surface of the first projection 12b1 and the upper surface of the bottom portion 11a.

Each ball unit 13 (slide supporting member) is set between each upper rail 12 and the corresponding lower rail 11 and supports both rails 11 and 12 in a way that the upper rail 12 is slidably movable relative to the lower rail 11. Further, the ball unit 13 positions the upper rail 12, which has been already assembled to the lower rail 11, to the finally assembled position illustrated in FIGS. 6 and 7. Going back to FIG. 4, each ball unit 13 includes four balls (rolling elements) 13a and a holder 13b supporting the balls 13a so that the balls 13a roll. Referring again to FIGS. 6 and 7, the first ball 13a from among the balls 13a is positioned to roll within a space defined between the corner C1 and the first inclined portion 12d facing the corner C1. Likewise, the second ball 13a from among the balls 13a is positioned to roll within a space defined between the corner C2 and the second inclined portion 12e, and the third ball 13a from among the balls 13a is positioned to roll within a space between the corner C3 and the third inclined portion 12f. The fourth ball 13a from among the balls 13a is positioned to roll within a space between the bent portion 11c and the fourth inclined portion 12g facing the bent portion 11c. Accordingly, slide portions A are established with the first inclined portion 12d, the second inclined portion 12e, the third inclined portion 12f and the fourth inclined portion 12g.

The lock mechanism 20 acts to releasably lock the upper rail 12 and the lower rail 11, i.e., acts to prohibit the upper rail 12 from moving relative to the lower rail 11 in the longitudinal direction. The lock mechanism 20 includes: the lock lever 21; a spring member 22; an operating lever 23; a plate-shaped elastic body 24; a pair of balls 25; a pin 26; first and second brackets 27 and 28; and two pins 29. In FIGS. 3 and 4, the operating lever 23, the elastic body 24 and the pin 26 are not illustrated to simplify the illustrations.

As is apparent from FIGS. 2 and 3, the lock lever 21 is attached within a cross section of the upper rail 12 and the lower rail 11 and extends in the front-rear direction. The lock lever 21 is pivotably equipped to the upper rail 12. The lock lever 21 is provided with the nails 21a, which are fitted into or engageable with the holes 12c1 of the fourth vertical portion 12c and the holes 12h1 of the uprising portion 12h. The nails 21a are further fitted into or engageable with the holes 11h1 of the second vertical portion 11h. These engagements between the holes and the nails 21a are each implemented from the inside of the rails 11 and 12 towards the outside thereof. That is, the lock lever 21 is engageably and disengageably fitted into the lock portions B2 and B3, which both are formed at the upper rail 12 and face each other, and the lock portion B1 of the lower rail 11 positioned between the lock portions B2 and B3. The lock lever 21 is provided with an arm 21b pushed by the operating lever 23 in response to operation of the operating lever 23.

The lock lever 21 is further formed with a pair of bearings 21c, both of which are formed at its longitudinal ends and extend in a right-and-left (lateral) direction. The bearings 21c each exhibit an approximately concave shape. The first and second brackets 27 and 28 include bearings 27a and 28a, respectively. The lock lever 21 is pivotably supported by the first and second brackets 27 and 28 via the balls 25 that come in contact with the bearings 21c from the frontward and the rearward and come in contact with the bearings 27a and 28a.

As is illustrated in FIGS. 3 and 4, the spring member 22 is provided between the lock lever 21 and the upper rail 12 inside of the cross section of the rails 11 and 12. The spring member 22 includes a mounting hole 22a at its front end and a long hole 22b at its rear end. The spring member 22 is integrally fixed to the upper rail 12 via the mounting hole 22a and is mounted to the upper rail 12 via the long hole 22b in a way that the spring member 22 is movable in the longitudinal direction. The spring member 22 further includes an arc portion at its longitudinally intermediate area, an arc portion which makes a contact with the lock lever 21 and biases the lock lever 21 in a locking direction, i.e., in a direction in which the nails 21a are fitted into at least one of the lock portions B1, B2 and B3.

The operating lever 23 acts to tilt the lock lever 21 and includes an operating portion 23a extending from the front end of the upper rail 12 towards a front. The operating lever 23 is mounted to the upper rail 12 to be tilted via the elastic body 24 inside the upper rail 12. The operating lever 23 functions to pivotally actuate the lock levers 21, which are supplied at the right and left seat portions, at the same time. Therefore, the left-side upper rail 12 is operatively connected to the right-side upper rail 12 by means of the operating portion 23a of the operating lever 23. This sort of lever is generally referred to as a loop handle.

The elastic body 24 is integrally equipped to the upper rail 12 by means of the pin 26, i.e., is fixed to the upper rail 12 by riveting or caulking an upper end of the pin 26. The elastic body 24 includes a support arm 24a, which is engageable with an engaging hole 23b of the operating lever 23 to support the operating lever 23 to be tilted. The elastic body 24 further includes a U-shaped supporting portion 24b, which elastically supports a U-shaped cross sectional rear end portion 23c of the operating lever 23, and an I-shaped supporting portion 24c. A rear end of the supporting portion 24b is engaged with a lower surface of the rear end portion 23c of the operating lever 23. A rear end of the supporting portion 24c is engaged with an upper surface of the rear end portion 23c of the operating lever 23, i.e., a bottom surface of the U-shaped cross section.

The first bracket 27 is integrally attached to the upper rail 12 by means of a pin 29. More specifically, the first bracket 27 is secured to the upper rail 12 by riveting or caulking an upper portion of the pin 29. The first bracket 27 is provided with a bearing 27a, which extends in the lateral direction and is formed in an approximately concave shape. The bearing 27a comes in contact with one of the balls 25 rotatably supported by the bearing 21c. The bearings 27a and 21c are inserted into a bearing bore 12i while interposing the ball 25 therebetween.

The second bracket 28 is integrally attached to the upper rail 12 by means of two pins 29. More specifically, the second bracket 28 is secured to the upper rail 12 by riveting or caulking an upper portion of the pins 29. The second bracket 28 is provided with a bearing 28a, which extends in the lateral direction and is formed in an approximately concave shape.

The bearing 28a comes in contact with the other one of the balls 25 rotatably supported by the bearing 21c. The bearings 28a and 21c are inserted into the other bearing bore 12i while interposing the ball 25 therebetween.

In the seat sliding apparatus for a vehicle with the above-described structure according to the embodiment of the present invention, as illustrated in FIG. 6, when the operating lever 23 is not operated, the lock lever 21 is biased by the spring member 22 so as to be maintained at a lock position, and the nails 21a are fitted into or engaged with the holes 12c1, 11h1 and 12h1 from the inside of the rails 11 and 12 to the outside thereof. In such circumstances, the upper rail 12 is hence locked with the lower rail 11, i.e., the upper rail 12 is prohibited from slidably moving relative to the lower rail 11.

Meanwhile, once the operating portion 23a of the operating lever 23 is lifted up and operated, the lock lever 21 is tilted against the biasing force of the spring member 22. The nails 21a are then disengaged from the holes 12c1 and 12h1 of the upper rail 12 and the holes 11h1 of the lower rail 11. In such circumstances, the lock mechanism 20 functions so as to release the locked state, and the upper rail 12 is allowed to slidably move relative to the lower rail 11.

Described below is assembling of the seat sliding apparatus with the above-described structure. First of all, the spring member 22 is attached to the upper rail 12. Meanwhile, the lock lever 21, which is engaged with the balls 25, the first bracket 27 and the second bracket 28 are also mounted to the upper rail 12 by means of the two pins 29. Secondarily, the upper rail 12 is inserted into the lower rail 11 and is placed at the insertion position. The upper rail 12 and the lower rail 11 are structured in a way that an interval between the first projection 12b1 of the upper rail 12 and each second projection 11g1 of the lower rail 11 is greater than zero along the vertically moving direction between the insertion position and the finally assembled position. Therefore, when the upper rail 12 is set at the insertion position relative to the lower rail 11, the first and second projections 12b1 and 11g1 are prevented from interfering from each other such that the upper rail 12 is easily set at the insertion position.

After having assembled the rails 11 and 12 together, the slide supporting members 13 are fitted into spaces between the lower rail 11 and the upper rail 12, and the upper rail 12 is then set to the finally assembled position as illustrated in FIG. 6. Here, each slide supporting member 13 is movable within a predetermined moving range and is prevented from being dropped out of the rails 11 and 12 for example by means of a retaining member. As a result, the first projection 12b1 of the upper rail 12, which has been placed at the finally assembled position, comes in contact with the second projection 11g1 of the lower rail 11, so that the upper rail 12 is restrained from slidably moving over the predetermined moving amount in the longitudinal direction. That is, the first projection 12b1 of the upper rail 12 and each second projections 11g1 of the lower rail 11 configure the restraining means.

As is apparent from the above description, according to the embodiment of the present invention, the upper rail 12 and the lower rail 11 are structured in a way that the interval between the first projection 12b1 of the upper rail 12 and each second projection 11g1 of the lower rail 11 is greater than zero in the vertically moving direction of the rails between the insertion position and the finally assembled position. Therefore, when the first and second rails 11 and 12 are assembled together, the first and second projections 12b1 and 11g1 are prevented from interfering from each other such that the upper rail 12 is easily positioned at the insertion position. Additionally, after having put the rails 11 and 12 together, the slide supporting members 13 are fitted into the spaces between the lower rail 11 and the upper rail 12, and the upper rail 12 is then assembled (located) to the finally assembled position. In this case, the upper rail 12 is restrained from moving over the predetermined moving amount back and forth because the projections 12b1 and 11g1, which have been in advance preformed at the upper rail 12 and the lower rail 11 respectively, contact with each other. Therefore, the seat sliding apparatus for a vehicle, which is supplied with a function for restraining a movement of the upper rail 12 over the predetermined moving amount, is established without undergoing any elaborate and/or time-consuming process after assembling the rails 11 and 12. Further, there is no need to apply strong force after having put the rails 11 and 12 together, which had been conventionally performed in that way. Therefore, deformation of the components is avoided, which leads to sliding performance damage reduction to the rails 11 and 12.

Still further, the first and second projections 12b1 and 11g1, which serve as the restricting means, are provided at one side of the upper rail 12 and the lower rail 11, i.e., at the right side in FIG. 6. Additionally, the lock portions B1, B2 and B3 are provided at the other side of the upper rail 12 and the lower rail 11, i.e., at the left side in FIG. 6, the lock portions B1, B2 and B3 into which the lock lever 21, which releasably locks the upper rail 12 to the lower rail 11, are engageably and disengageably fitted. That is, the restricting means are provided at the side that is different from the side at which the lock portions are provided. Therefore, a height of the seat sliding apparatus for the vehicle is controlled at a low level, and the structure of the apparatus itself is simplified.

Still further, the first projection 12b1 protrudes laterally outwardly from a surface of the third vertical portion 12b, and the second projections 11g1 protrude downwardly at the longitudinal ends of the first vertical portion 11g. As aforementioned, the first projection 12b1 is formed at a portion of the upper rail 12, a portion which is not distant from an attaching portion of the upper rail 12 to the seat 2. Even when load is applied to the rail 11 and/or 12 in the longitudinal direction in a state where the first projection 12b1 is in contact with the second projection 11g1, the upper rail 12 is prevented from elastically deforming and the first projection 12b1 is not easily disengaged from the second projection 11g1.

Still further, the space S is defined between the upper rail 12 and the lower rail 11, the space S in which the upper rail 12 is movable between the insertion position and the finally assembled position in the vertically moving direction. According to the method of assembling the seat sliding apparatus for the vehicle above described, the interval between the first projection 12b1 and each second projection 11g1 along the moving direction of the upper rail 12 between the insertion position and the finally assembled position is set to be greater than zero. The upper rail 12 is inserted into the lower rail 11 and is positioned at the insertion position. The upper rail 12 is then moved from the insertion position to the finally assembled position in the vertically moving direction. In a state where the upper rail 12 has reached the finally assembled position, the slide supporting member 13 is fitted between the upper rail 12 and the lower rail 11. Therefore, the seat sliding apparatus for a vehicle is easily established.

Still further, the present invention is applicable to a seat slide apparatus for a vehicle which is a different type from the above description, as far as the upper rail 12 is provided with the first projection in a way that the first projection does not interfere with any portions of the lower rail 11 when one of the rails 11 and 12 is inserted into the other one, and the lower rail 11 is provided with the second projection in a way that the second projection does not interfere with any portions of the upper rail 12 when one of the rails 11 and 12 is inserted into the other one. According to this, when the rails 11 and 12 are put together, the first and second projections are prevented from interfering with each other and the upper rail 12 is readily set at the insertion position. After having assembled the rails 11 and 12 together, the slide supporting members 13 are inserted between the rails 11 and 12 and the upper rail 12 is then positioned to the finally assembled position. Here, the first and second projection, which had preformed before assembling the rails 11 and 12 together, act to restrain a longitudinal movement of the upper rail over the predetermined moving amount. Therefore, an elaborate process is not needed after putting the rails together, which had been conventionally performed in that way. That is, it is possible to supply the seat sliding apparatus for a vehicle which has a function for restraining a movement of the upper rail over the predetermined moving amount, with a simple process. Moreover, there is no need to apply strong force after combining both of the rails, which had been conventionally performed in that way. Therefore, it is possible to prevent deformation of the components and lead to reduction in sliding performance damage to the rails.

Figure 9:
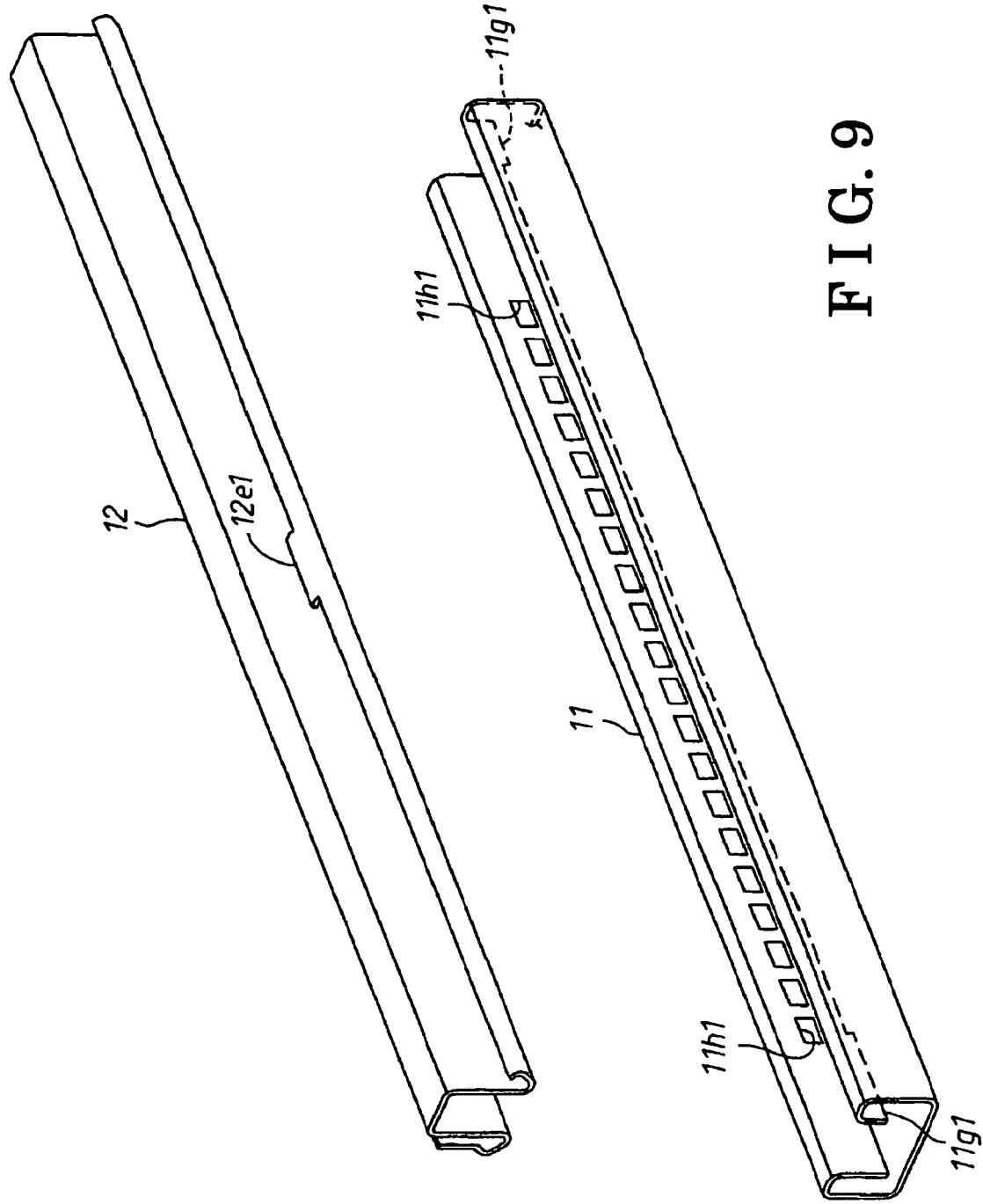
FIG. 9 is an exploded perspective view illustrating an upper rail and a lower rail according to a variation as viewed from an opposite side to FIG. 4.
Figure 10:
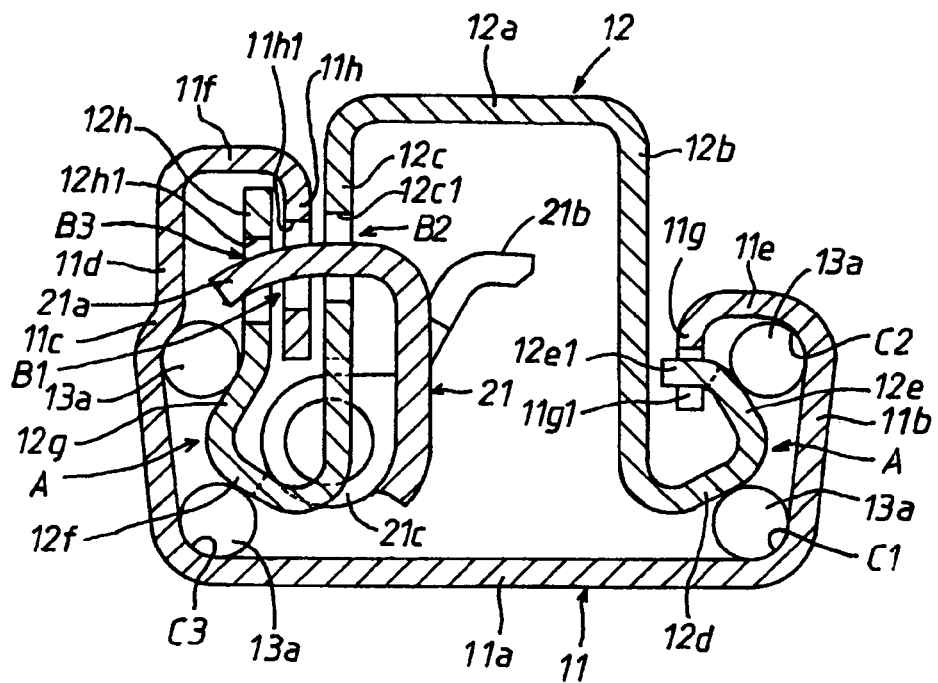
FIG. 10 is a cross sectional view illustrating a portion in which a sliding portion and a lock portion of the upper rail in FIG. 9 lie over.
Figure 11:
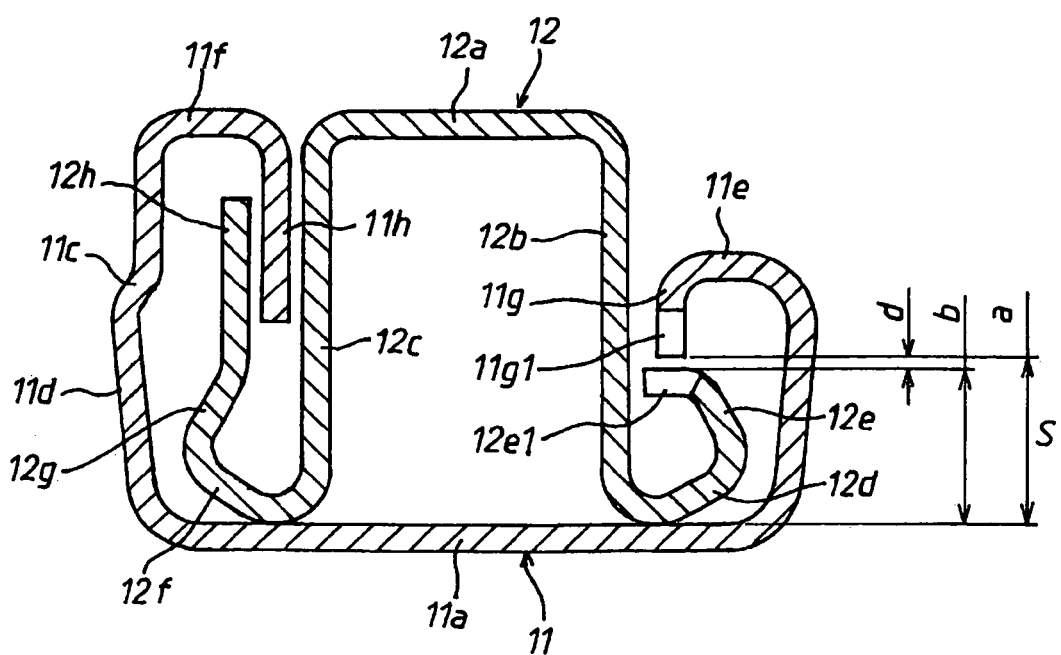
FIG. 11 is a cross sectional view illustrating the upper rail in FIG. 9 at an insertion position and a positional relationship of the upper rail at the insertion position relative to the lower rail.

Still further, according to the above-described embodiment, the first projection 12b1 protrudes laterally outwardly from a surface of the third vertical portion 12b, and the second projections 11g1 protrude downwardly at the longitudinal ends of the first vertical portion 11g. Alternatively, as illustrated in FIGS. 9, 10 and 11, a first projection 12e1 can protrude laterally inwardly at the other edge of the second inclined portion 12e, and each second projection 11g1 can protrude downwardly at the longitudinal ends of the first vertical portion 11g. FIG. 9 is an exploded perspective view illustrating only the upper rail and the lower rail as seen in the same direction as FIG. 5. FIG. 10 is a cross sectional view illustrating a portion of the seat sliding apparatus, in which a sliding portion and a lock portion of the upper rail overlap. FIG. 11 is a sectional view illustrating the upper rail at the insertion position.

In this case, the first projection 12e1 is provided at the second inclined portion 12e, which is different from the above-described embodiment, and other structures and functions are identical to those of the first embodiment. The first projection 12e1 is easily formed.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat sliding apparatus for a vehicle, comprising:
a lower rail secured to a stationary portion of the vehicle;
an upper rail fixedly attached to a seat of the vehicle and assembled to the lower rail to be movable in a front-rear direction of the seat, the upper rail being movable between an insertion position and a finally assembled position in a vertical direction within a space defined between the upper rail and the lower rail;
restraining means for restraining a sliding movement of the upper rail over a predetermined moving amount in the front-rear direction of the seat, the restraining means including a first projection extending in a lateral direction from a downardly-depending wall of the upper rail and second projections extending in a vertical direction from a downwardly-depending wall of the lower rail, the lower rail and the upper rail being structured in a way that an interval between the first projection and each second projection along the vertical direction in which the upper rail moves between the insertion position and the finally assembled position is greater than zero, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction.

2. A seat sliding apparatus for a vehicle according to claim 1, wherein the restraining means is provided at one side of the upper rail and the lower rail, a lock portion is provided at the other side of the upper rail and the lower rail, and a lock lever, which releasably locks the upper rail with the lower rail, is engageably fitted into the lock portion.

3. A seat sliding apparatus for a vehicle comprising:

a lower rail secured to a stationary portion of the vehicle;

an upper rail fixedly attached to a seat of the vehicle and assembled to the lower rail to be movable in a front-rear direction of the seat, the upper rail being movable between an insertion position and a finally assembled position in a vertical direction within a space defined between the upper rail and the lower rail;

restraining means for restraining a sliding movement of the upper rail over a predetermined moving amount in the front-rear direction of the seat, the restraining means including a first projection performed at the upper rail and second projections preformed at the lower rail, the lower rail and the upper rail being structured in a way that an interval between the first projection and each second projection along the vertical direction in which the upper rail moves between the insertion position and the finally assembled position is greater than zero, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction;

wherein the lower rail includes:

a bottom portion arranged in parallel with the stationary portion of the vehicle;

a first sidewall arranged vertically at a side edge of the bottom portion;

a second sidewall arranged vertically at the other side edge of the bottom portion and being higher than the first sidewall, the second sidewall being provided with a bent portion;

a first upper wall connected, at an edge thereof, to an upper edge of the first sidewall and extending towards the second sidewall;

a second upper wall connected, at an edge thereof, to an upper edge of the second sidewall and extending towards the first sidewall;

a first vertical portion extending downwardly from the other edge of the first upper wall towards the bottom portion, the second projections projecting downwardly from both ends of the first vertical portion; and a second vertical portion extending downwardly from the other edge of the second upper wall towards the bottom portion; and the upper rail includes;

an upper portion arranged in parallel to the bottom portion of the lower rail;

third vertical portion extending downwardly from an edge of the upper portion and arranged between the first vertical portion and the second vertical portion, the first projection projecting laterally outwardly at a wall surface of the third vertical portion;

a fourth vertical portion extending downwardly from the other edge of the upper portion and arranged between the first vertical portion and the second vertical portion, the fourth vertical portion having a height identical to the third vertical portion;

a first inclined portion connected, at an edge thereof, to a lower edge of the third vertical portion and extending in an inclined upward direction towards the first sidewall, the first inclined portion being arranged so as to face a corner with a space, the corner being defined by the bottom portion and the first sidewall;

a second inclined portion connected, at an edge thereof, to the other edge of the first inclined portion and extending in an inclined upward direction towards the first vertical portion, the second inclined portion being arranged so as to face a corner with a space, the corner being defined by the first sidewall and the first upper wall;

a third inclined portion connected, at an edge, to a lower edge of the fourth vertical portion and extending in an inclined upward direction towards the second sidewall, the third inclined portion being arranged so as to face a corner with a space, the corner being defined by the bottom portion and the second sidewall;

a fourth inclined portion connected, at an edge thereof, to the other edge of the third inclined portion and extending in an inclined upward direction towards the second vertical portion, the fourth inclined portion being arranged so as to face the bent portion with a space; and an uprising portion connected to the other edge of the fourth inclined portion and facing the second vertical portion in a parallel manner.

4. A seat sliding apparatus for a vehicle comprising:

a lower rail secured to a stationary portion of the vehicle;

an upper rail fixedly attached to a seat of the vehicle and assembled to the lower rail to be movable in a front-rear direction of the seat, the upper rail being movable between an insertion position and a finally assembled position in a vertical direction within a space defined between the upper rail and the lower rail;

restraining means for restraining a sliding movement of the upper rail over a predetermined moving amount in the front-rear direction of the seat, the restraining means including a first projection preformed at the upper rail, and second projections preformed at the lower rail, the upper rail being structured in a way that an interval between the first projection and each second projection along the vertical direction in which the upper rail moves between the insertion position and the finally assembled position is greater than zero, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction;

wherein the lower rail includes:

a bottom portion arranged in parallel with the stationary portion of the vehicle;

a first sidewall arranged vertically at a side edge of the bottom portion;

a second sidewall arranged vertically at the other side edge of the bottom portion and being higher than the first sidewall, the second sidewall being provided with a bent portion;

a first upper wall connected, at an edge thereof, to an upper edge of the first sidewall and extending towards the second sidewall;

a second upper wall connected, at an edge thereof, to an upper edge of the second sidewall and extending towards the first sidewall;

a first vertical portion extending downwardly from the other edge of the first upper wall towards the bottom portion, the second projections projecting downwardly from both ends of the first vertical portion; and a second vertical portion extending downwardly from the other edge of the second upper wall towards the bottom portion; and the upper rail includes;

an upper portion arranged in parallel to the bottom portion of the lower rail;

a third vertical portion extending downwardly from an edge of the upper portion and arranged between the first vertical portion and the second vertical portion;

a fourth vertical portion extending downwardly from the other edge of the upper portion and arranged between the first vertical portion and the second vertical portion, the fourth vertical portion having a height identical to the third vertical portion;

a first inclined portion connected, at an edge thereof, to a lower edge of the third vertical portion and extending in an inclined upward direction towards the first sidewall, the first inclined portion being arranged so as to face a corner with a space, the corner (being defined by the bottom portion and the first sidewall;

a second inclined portion connected, at an edge thereof, to the other edge of the first inclined portion and extending in an inclined upward direction towards the first vertical portion, the second inclined portion being arranged so as to face a corner with a space, the corner being defined by the first sidewall and the first upper wall, the first projection projecting at the other edge of the second inclined portion laterally inwardly;

a third inclined portion connected, at an edge, to a lower edge of the fourth vertical portion and extending in an inclined upward direction towards the second sidewall, the third inclined portion being arranged so as to face a corner with a space, the corner being defined by the bottom portion and the second sidewall;

a fourth inclined portion connected, at an edge thereof, to the other edge of the third inclined portion and extending in an inclined upward direction towards the second vertical portion, the fourth inclined portion being arranged so as to face the bent portion with a space; and an uprising portion connected to the other edge of the fourth inclined portion and facing the second vertical portion in a parallel manner.

5. A seat sliding apparatus for a vehicle, comprising:

a lower rail secured to a stationary portion of the vehicle;

an upper rail fixedly attached to a seat of the vehicle and assembled to the lower rail to be movable in a front-rear direction of the seat, the upper rail being structured without a contact with a portion of the lower rail when inserting one of the lower and upper rails to the other one thereof, and the lower rail being structured without a contact with a portion of the upper rail when inserting one of the lower and upper rails to the other one thereof;

restraining means for restraining a sliding movement of the upper rail over a predetermined moving amount in the front-rear direction of the seat, the restraining means including a first projection extending in a lateral direction from a downwardly-depending wall of the upper rail and second projections extending in a vertical direction from a downwardly-depending wall of the lower rail, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction.

6. A method of assembling a seat sliding apparatus for a vehicle, the seat sliding apparatus comprising:

a lower rail secured to a stationary portion of the vehicle;

an upper rail fixedly attached to a seat of the vehicle and assembled to the lower rail to be movable in a front-rear direction of the seat, the upper rail being movable between an insertion position and a finally assembled position in a vertical direction within a space defined between the upper rail and the lower rail;

restraining means for restraining a sliding movement of the upper rail over a predetermined moving amount in the front-rear direction of the seat, the restraining means including a first projection extending in a lateral direction from a downwardly-depending wall of the upper rail and second projections extending in a vertical direction from a downwardly-depending wall of the lower rail, the lower rail and the upper rail being structured in a way that an interval between the first projection and each second projection along the vertical direction in which the upper rail moves between the insertion position and the finally assembled position is greater than zero, and the restraining means restraining the sliding movement of the upper rail over the predetermined moving amount by a contact between the first projection and each second projection; and a slide supporting member disposed between the upper rail and the lower rail, the slide supporting member supporting the upper rail to be slidable in the front-rear direction relative to the lower rail and positioning the upper rail to the finally assembled position in the vertical direction, the method comprising the steps of;

inserting the upper rail into the lower rail and positioning the upper rail to the insertion position;

moving the upper rail from the insertion position to the finally assembled position; and inserting the slide supporting member between the upper rail and the lower rail so that the upper rail is positioned at the finally assembled position.

* * * * *

UNITED STATES PATENT AND TRADEMARK OFFICE
CERTIFICATE OF CORRECTION

PATENT NO. : 7,503,614 B2
APPLICATION NO. : 11/585239
DATED : March 17, 2009
INVENTOR(S) : Yukifumi Yamada et al.

It is certified that error appears in the above-identified patent and that said Letters Patent is hereby corrected as shown below:

Claim 1, col. 11, line 1 - "downardly-depending" should read --downwardly-depending--.

Signed and Sealed this
Eighth Day of March, 2011

David J. Kappos
*Director of the United States Patent and Trademark Office*